Figure 1:
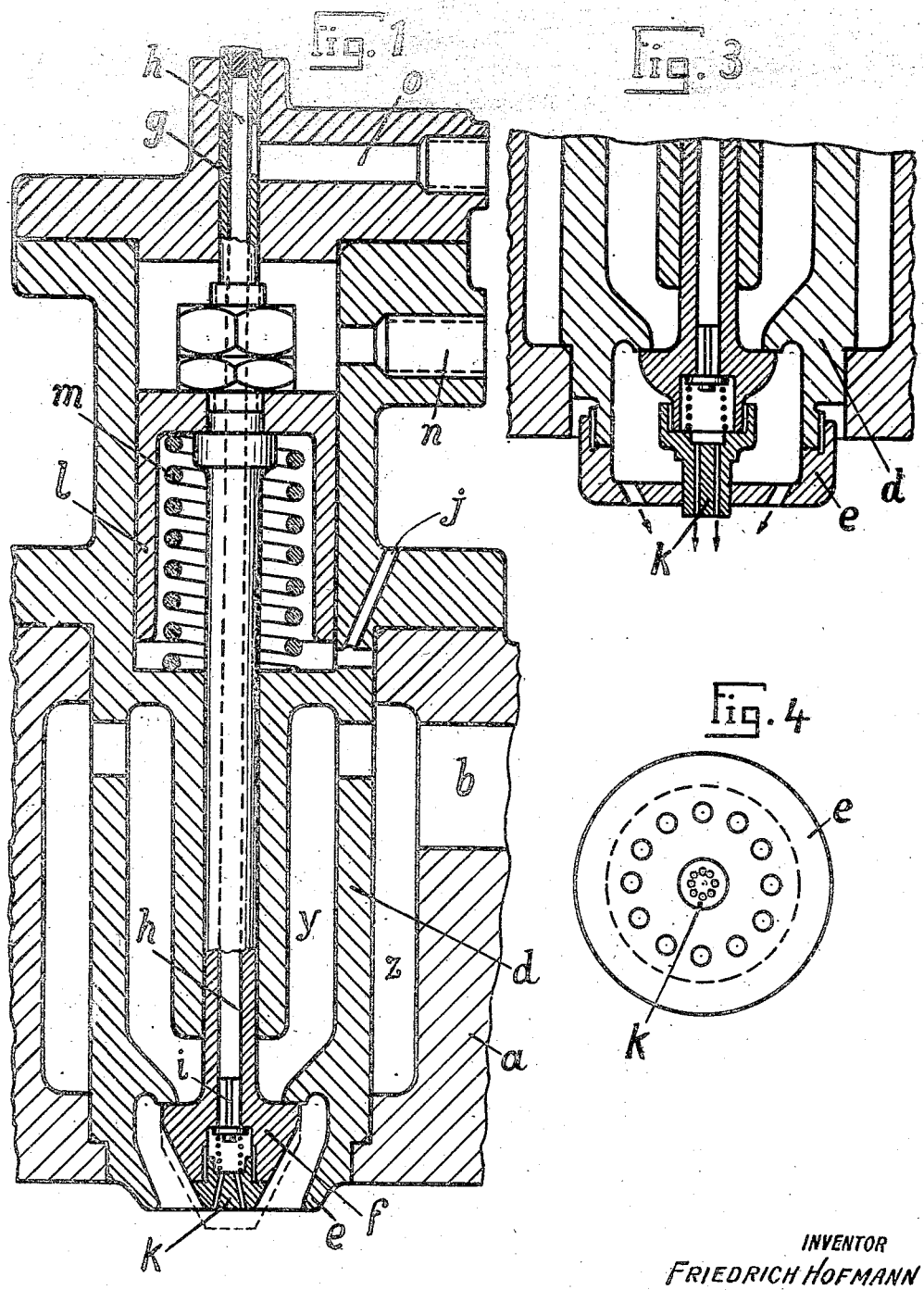

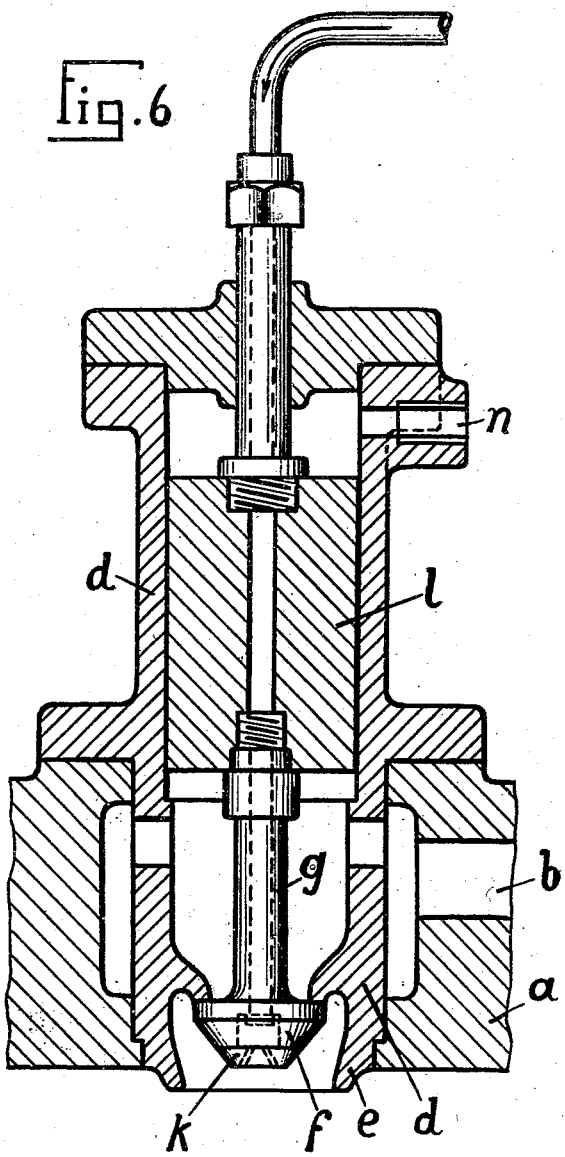

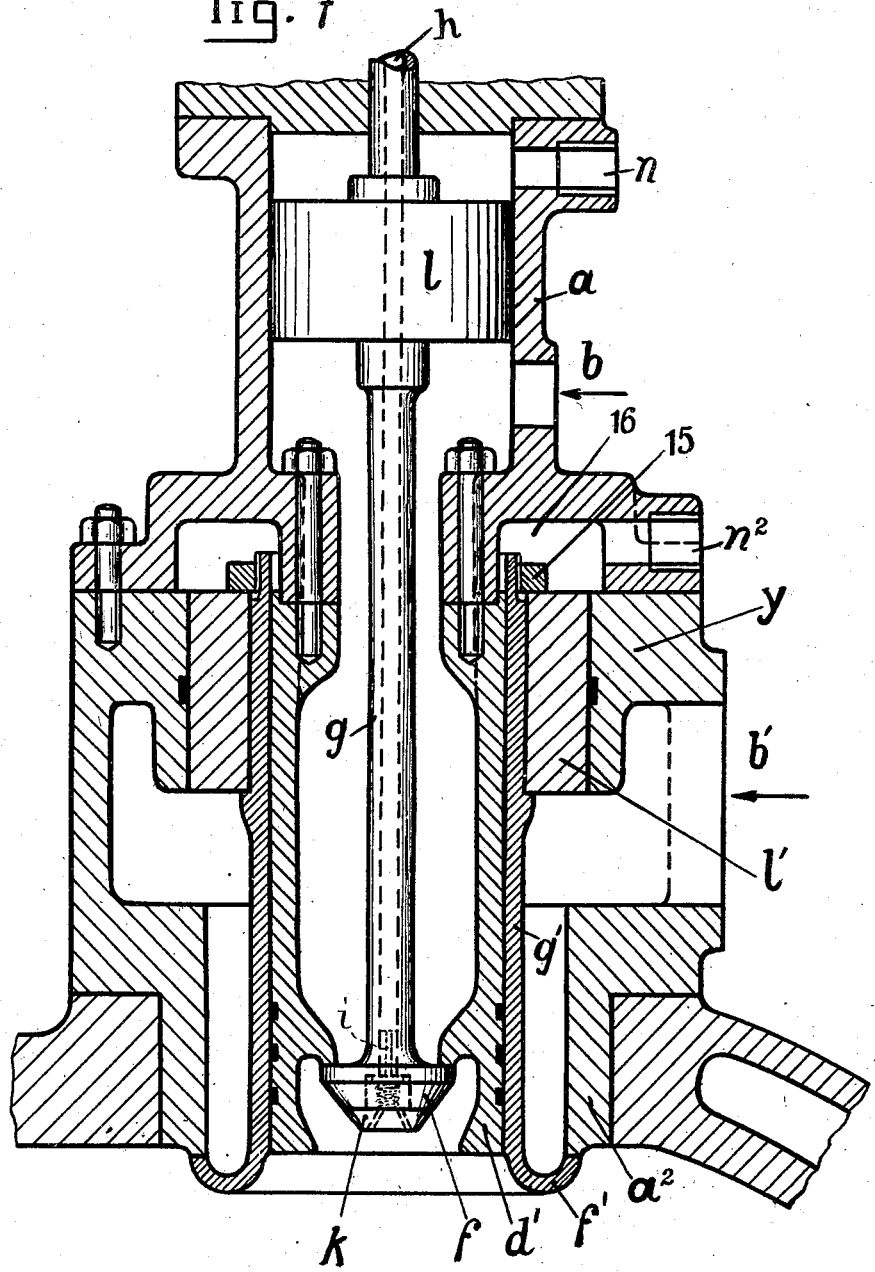

Dec. 30, 1930.  F. HOFMANN  1,786,946
FUEL INJECTION DEVICE FOR EXPLOSION ENGINES
Filed May 13, 1927  6 Sheets-Sheet 5
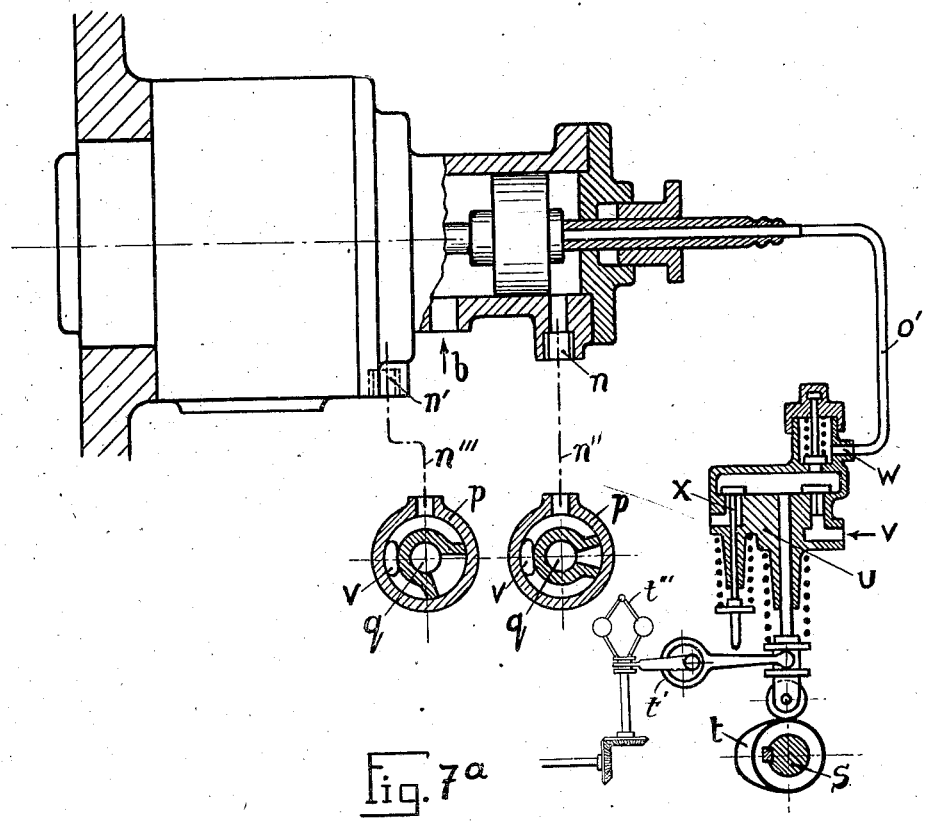
Fig. 7ᵃ
INVENTOR
FRIEDRICH HOFMANN
BY
ATTORNEYS

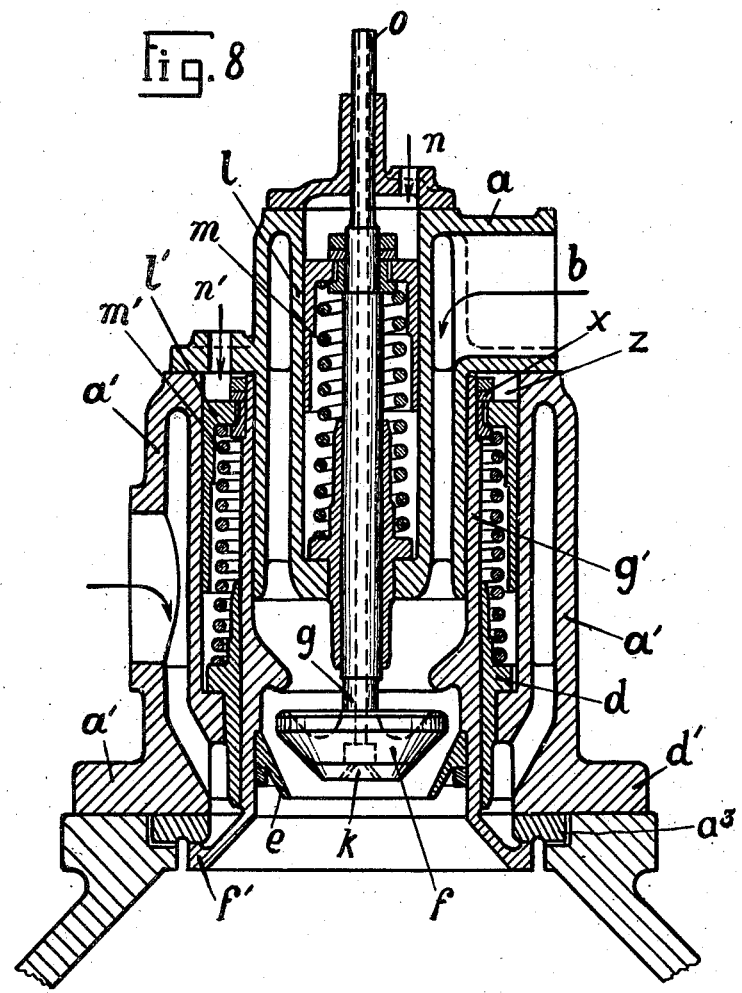

Patented Dec. 30, 1930

1,786,946

UNITED STATES PATENT OFFICE

FRIEDRICH HOFMANN, OF MULHEIM-ON-THE-RUHR, GERMANY, ASSIGNOR TO HOLZ-WARTH GAS TURBINE CO., OF SAN FRANCISCO, CALIFORNIA, A CORPORATION OF DELAWARE

FUEL-INJECTION DEVICE FOR EXPLOSION ENGINES

Application filed May 13, 1927, Serial No. 191,109, and in Germany April 4, 1927.

My present invention relates to explosion or similar combustion engines, particularly of the turbine type, in which there is provided an explosion chamber filled with a charge of air and adapted to receive a finely distributed or atomized jet of oil or other liquid fuel, the mixture of air and fuel being then ignited in any well-known or approved manner, and the pressure of the resulting combustion gases being utilized to operate the turbine or engine proper. In oil turbines of this character a proper degree of efficiency can be obtained only if the contents of the explosion chamber are compressed before ignition. From said chamber the combustion gases pass to the turbine nozzle through an outlet controlled by a nozzle valve, said gases expanding on their way to the turbine. It is customary to pass scavenging air through the combustion chamber, the nozzle, and the turbine proper after the expansion of the combustion gases, at a pressure which is but slightly above atmospheric or above the exhaust pressure of the turbine. As heretofore constructed, turbines of this type, therefore, required air at three different pressures: low-pressure air for scavenging, charging air of a moderate intermediate pressure, in order to obtain combustion under the most favorable thermic conditions, and high-pressure air for atomizing, in order to secure as thorough an atomization of the oil (or other fuel) as possible and thus to mix such liquid fuel sufficiently with the charging air during the short period of time available for this purpose. Accordingly, power plants of this type as constructed hitherto required three separate admission devices, viz.: a scavenging air valve, a charging air valve, and an oil-atomizing valve.

My present invention effects a material simplification by constructing the charging air valve and the oil-supply nozzle in such a manner that the moderate or medium pressure of the charging air will suffice for atomizing the liquid fuel. I am thus enabled to dispense with the high-pressure air pump employed heretofore for atomizing the fuel, as well as with the mechanism for operating such air pump and with one of the valves associated with the explosion chamber. I introduce the charging air as an annular stream of cylindrical or conical form, and inject the oil or other liquid fuel in fine jets into the interior of such hollow cone or cylinder while the air is in motion, so that the particles of liquid fuel are entrained by the moving particles of air in the interior of the conical or cylindrical stream. The oil-supply nozzle of my improved injector is preferably arranged within the charging air valve, through which the air is introduced to form an annular conical or cylindrical stream.

Figure 2:
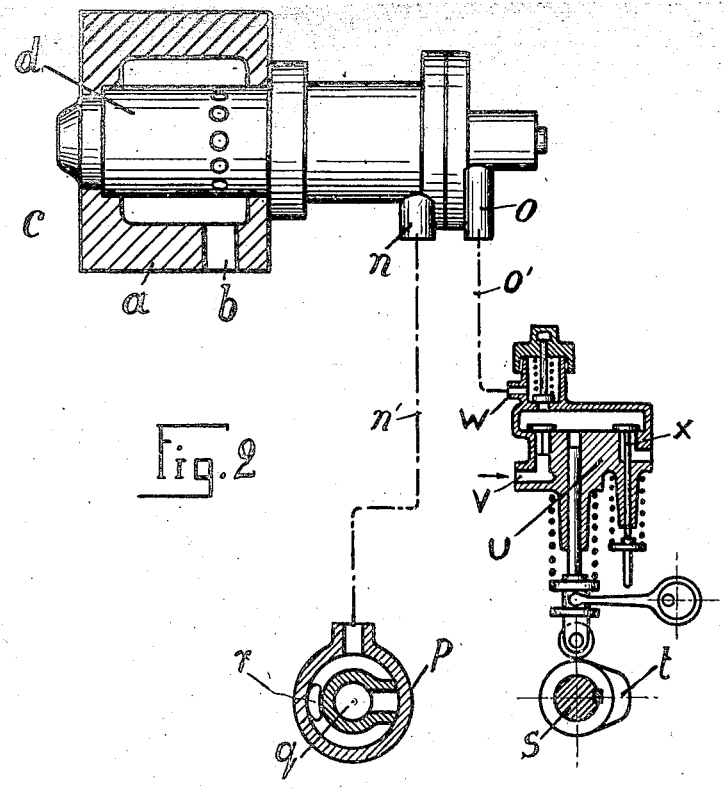

Several satisfactory examples of my invention are illustrated by the accompanying drawings, in which Fig. 1 is a longitudinal section through a combined air and liquid fuel valve embodying my improvements; Fig. 2 is a diagrammatic view, with parts in section, showing said valve and the actuating mechanism associated therewith; Fig. 3 is a partial longitudinal section through another form of my invention; Fig. 4 is an end view of the valve shown in Fig. 3; and Figs. 5, 6, 7, 7ª and 8 are partial longitudinal sections of four additional embodiments of my invention, Fig. 7ª showing the valve of Fig. 7 in association with its controlling mechanism.

In Figs. 1 and 2, $a$ indicates a portion of the housing of an explosion turbine, provided with an inlet $b$ through which the charging air from any suitable source is introduced under a moderate pressure, into a chamber $z$ which surrounds a valve casing $d$ and communicates with an interior chamber $y$ of said casing. The latter is formed with a seat for the charging air valve $f$, opening toward the explosion chamber indicated at $c$. This valve, together with its tubular stem $g$, is movable lengthwise in the center of the valve casing $d$, in unison with an actuating piston $l$, urged toward the closed position of the valve by means of a coiled spring $m$, and toward the open position of the valve by means of a fluid (for instance oil) under pressure admitted through a channel $n$. A vent duct $j$ is provided to allow air to enter or escape freely so that there will be no material resistance to the movement of the piston $l$. The longitudinal channel $h$ of the valve stem $g$ is closed at its outer end and provided with a lateral opening by which it communicates permanently with a channel $o$ for the admission of liquid fuel. The tapering valve $f$ has an interior chamber communicating permanently with the combustion chamber or explosion chamber $c$ through fine ducts in a plug or nozzle $k$, while the communication of said chamber with the channel $h$ is controlled by a check valve $i$ opening toward said chamber. Adjacent to the explosion chamber $c$, the valve casing $d$ is formed with a guide or nozzle $e$ to direct the air issuing from the said casing, in such a manner as to mix it thoroughly with the fuel issuing from the nozzle $k$. To this end, the guide $e$ may be given a conical form so as to cause the air stream to converge in front of the valve. At the point of convergence, the air is at substantially its greatest velocity and is there struck by the fuel jet whose velocity is comparatively low, so that the velocity differential between the air and fuel streams at such point is very great and thorough atomization of the fuel is promoted.

When oil or other medium under pressure is admitted through the channel $n$ (as by mechanism of the type described below with reference to Fig. 2), the piston $l$ will be moved against the resistance of the spring $m$, bringing the valve $f$ to the open position indicated by dotted lines in Fig. 1, so that the charging air from the inlet $b$ and chambers $z$, $y$ will be discharged into the combustion chamber $c$ in the form of a hollow conical jet. If while the air valve is thus open, liquid fuel is delivered from the channel $o$ through the channel $h$ of the valve stem $g$, such fuel will be projected in the form of fine jets through the fine ducts of the plug or nozzle $k$ into the hollow or annular conical stream of air. The fuel will thus be atomized thoroughly and mixed intimately with the air; in fact, the fuel is not simply reduced to a spray of fine liquid globules, but converted into a vapor, so that an electric spark will ignite the mixture quickly and cause complete combustion.

In Fig. 2 I have indicated diagrammatically a suitable arrangement for actuating the valve described above. The channel $n$ is connected by a pipe $n'$ with a port of a casing $p$ in which a distributor $q$ is mounted to rotate. The interior of this distributor communicates with a supply of a medium (oil) under pressure, for instance eight atmospheres, and has a discharge port adapted to communicate with the pipe $n'$, once for each revolution of the distributor. At other times, however, the pipe $n'$ communicates, through the interior of the casing $p$, with an outlet port $r$, connected with a discharge pipe (not shown) in which atmospheric pressure prevails. Every time the interior of the distributor $q$ registers with the port leading to the pipe $n'$, the fluid under pressure will reach the piston $l$ and cause the valve $f$ to open; as soon as the pipe $n'$ is again in communication with the outlet port $r$, the spring $m$ will close the valve $f$, the piston $l$ moving in such a direction as to expel the actuating fluid through the pipe $n'$ and port $r$. A cam shaft $s$ is operated by the engine (through suitable connections, not shown), and by appropriate transmission mechanism (not illustrated) the distributor $q$ is given the same number of revolutions per minute as the shaft $s$. A cam $t$ on said shaft actuates the fuel pump $u$. The latter takes in fuel through the supply port $v$ from a fuel reservoir (not shown) and expels it through the outlet $w$ and a pipe $o'$ into the channels $o$ and $h$. I have indicated in Fig. 2 an automatic regulator of well-known character, employing an overflow valve which is opened by a lever adjusted to different levels by the eccentric mechanism $t'$ shown at the right, the eccentric being controlled by the speed governor $t''$ operated by the shaft of the engine. The upstroke or working stroke of the pump $u$ will always begin at the same time, but the timing of the overflow valve $x$ will vary according to the engine speed, thus varying the amount of fuel delivered to the channels $o$, $h$ at each stroke of the pump $u$. I desire it to be understood that any other suitable control mechanism may be employed for the fuel pump, and, in general, any suitable means for regulating the feed of fuel in accordance with the load on the engine may be used.

The construction illustrated by Figs. 3 and 4 has a guide $e'$ with a transverse wall through which the fuel nozzle $k$ projects, said wall having an annular series of converging openings. The individual air jets issuing from these openings will together form an annular air stream of conical shape. Fig. 3 shows parallel longitudinal ducts in the fuel nozzle $k$; they might, however, diverge in the same manner as in Fig. 1.

Figure 5:
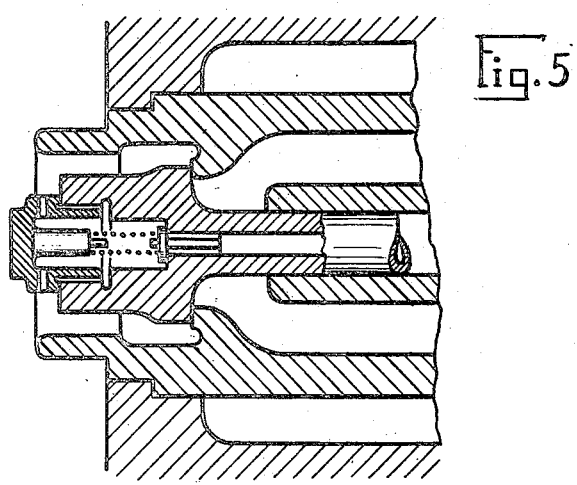

In Fig. 5, the opening through which the air is discharged as an annular stream into the combustion chamber $c$, is formed between the inner cylindrical wall of an extension $a'$ of the housing $a$ and the outer cylindrical wall of an extension $f'$ of the valve $f$. The stream of air issuing into the combustion chamber will, in this case, have the shape of a hollow cylinder. The outlet ducts of the fuel nozzle $k'$ are preferably radial, as shown, in order that the fuel jets may impinge on the annular stream of air as soon as possible after its formation and thus be atomized most efficiently.

According to Fig. 6, the mechanism for actuating the valve $f$ has been simplified by omitting the spring $m$ of Fig. 1 and effecting the retraction of the valve by the pressure of the charging air itself. If the external atmospheric pressure is designated by $p_0$, and if the hydraulic pressure behind the piston $l$ as well as the pressure in the explosion chamber be likewise equal to $p_0$ just prior to charging said chamber, let further $p$ designate the charging pressure, $f$ the effective cross-section of the valve, $f'$ the cross-section of the valve stem, and $F$ the cross-section of the piston, then the force pressing the valve against its seat will be equal to $$p_0 f + (F-f')p - (f-f')p - (F-f')p_0$$

or $$(p-p_0)(F-f) - p_0 f'.$$

Since both $p-p_0$ and $F-f$ are greater than zero, it follows that the product $(p-p_0)(F-f)$ likewise is greater than zero, and this product can readily be given a value greater than the other term, $p_0 f'$, so that there will be a positive force pressing the valve toward its seat. When the valve is to be opened, this force would be overcome by increasing the hydraulic pressure. Reducing the hydraulic pressure would allow said positive force to become preponderant again and to close the valve. The force closing the valve would be greater than the pressure to be overcome during the opening of the valve, for the reason that during charging the counterpressure increases in the explosion chamber.

Fig. 7 illustrates a construction in which the combined valve for the admission of the fuel and of the charging air is disposed within the scavenging air valve of the explosion chamber, thus combining in a single element or unit all the devices required for charging and scavenging the explosion chamber. The inner valve casing $d'$ is surrounded by the sleeve valve $f'$, $g'$ consisting of a tubular body and a flange or bell constituting the valve proper. Said tubular body is surrounded by an annular piston $l'$ to which it is secured by a nut 15. The outlet end of the casing $d'$ is tapered, like the guide $e$ of Fig. 1, and for a similar purpose. The stationary body $a^2$ which has a seat for the portion $f'$ of the sleeve valve also forms a guide along which the piston $l'$ moves. The body $a^2$ and the valve casing $d'$ are bolted or otherwise secured to the housing $a$, provided at its outer portion with a cylinder for the piston $l$. Between the two parts $a$, $d'$ is formed a chamber 16 the port $n^2$ of which is connected with a suitable hydraulic controlling device. The annular space between the body $a^2$ and the sleeve $g'$ communicates with an opening or nipple $b'$ connected with the pipe (not shown) which supplies air for scavenging the explosion chamber. As long as the oil or other medium in the chamber 16 is under atmospheric pressure, the scavenging air valve $f'$ will be held against its seat on the body $a^2$, by the preponderance of air pressure against the lower face of the piston $l'$. As soon, however, as a liquid under a pressure higher than atmospheric is admitted to the chamber 16, the valve $f'$ will be forced open and scavenging air admitted to the explosion chamber. The hydraulic control of this valve is independent of the hydraulic control of the charging air valve $f$, which is effected by admitting oil or other suitable medium under pressure, through the port or nipple $n$. Devices like the one shown at $p$, $q$ in Fig. 2 may be employed to control the supply of oil under pressure to the ports $n$, $n^2$ of Fig. 7. The arrangement shown in Fig. 7 would be associated with a fuel pump of any suitable character (not shown), independent of the hydraulic control of the valves $f$ and $f'$, and adapted to inject fuel at the proper time into the channel $h$ and through the nozzle $k$ into the annular stream of charging air issuing from the device when the valve $f$ is open. The fuel conduit may be provided with a check valve $i$.

Fig. 8 illustrates a unitary structure combining a scavenging valve with a valve for the injection of the charging air and of the fuel. The arrangement differs from the one shown in Fig. 7 by the employment of springs for retracting the valves, instead of relying on air pressure to do this. The charging air valve $f$ with its tubular stem $g$ and actuating hydraulic piston $l$ is again located within a housing $a$, which also receives the retracting spring $m$ and is connected through the port or nipple $b$ with the reservoir from which the charging air is supplied. At the end nearest the explosion chamber, this housing has a portion provided with a cylindrical outer surface, surrounded by a sleeve $g'$. The latter has a seating surface for the charging air valve $f$, and at its forward end forms the scavenging air valve $f'$. The sleeve $g'$ is surrounded by the tubular guide $d$ located in the outer housing $a'$ and carries an annular piston $l'$ movable in a cylinder formed in said outer housing. An annular chamber $z$ formed between the piston $l'$ and the flange by which the housing $a$ is fitted to the housing $a'_0$, has a port $n'$ through which a hydraulic medium under pressure may be admitted to operate the piston $l'$ and open the scavenging air valve $f'$, in substantially the same manner as in Fig. 7. This valve may be seated either directly on a suitable surface of the outer housing $a'$, or a separate washer or seat member $a^3$ may be provided, as shown.

Various modifications may be made without departing from the nature of my invention as defined in the appended claims.

I claim:

1. A device for injecting air and fuel into a combustion chamber, comprising a casing provided with a connection for the admission of compressed air, with an outlet for the discharge of such compressed air, and with a valve seat between said connection and said outlet, a valve adapted to engage said seat and to establish or interrupt the passage of compressed air to said outlet, a tubular stem movable in unison with said valve, the latter being provided with a passage communicating with the interior of said stem for discharging fuel adjacent to said air outlet, a pump for supplying fuel to said stem, a piston connected with said valve and of greater area than such valve, one face of said piston being exposed to the pressure of said compressed air in such a way as to tend to seat said valve, a cylinder in which said piston is movable, and a controlling device associated with said cylinder to admit an actuating medium under pressure into such cylinder on the side of the piston opposite to the one exposed to the action of said compressed air, to move such piston into the valve-opening position.

2. A device for injecting air and fuel into a combustion chamber, comprising a casing provided with a connection for the admission of compressed air, with an outlet for the discharge of such compressed air, and with a valve seat between said connection and said outlet, a valve adapted to engage said seat and to establish or interrupt the passage of compressed air to said outlet, a tubular stem movable in unison with said valve, the latter being provided with a passage communicating with the interior of said stem for discharging fuel adjacent to said air outlet, a pump for supplying fuel to said stem, a scavenging air valve surrounding said casing and slidable thereon, and an outer valve casing provided with a seat for said scavenging air valve and with a connection for the supply of scavenging air.

3. A device for injecting air and fuel into a combustion chamber, comprising a casing provided with a connection for the admission of compressed air, with an outlet for the discharge of such compressed air, and with a valve seat between said connection and said outlet, a valve adapted to engage said seat and to establish or interrupt the passage of compressed air to said outlet, a tubular stem movable in unison with said valve, the latter being provided with a passage communicating with the interior of said stem for discharging fuel adjacent to said air outlet, a pump for supplying fuel to said stem, a scavenging air valve surrounding said casing and slidable thereon, an outer valve casing provided with a seat for said scavenging air valve, with a connection for the supply of scavenging air, and with a cylindrical portion having a connection for the admission of an actuating medium under pressure, and an annular piston movable in said cylindrical portion and operatively connected with said scavenging air valve.

4. A device for injecting air and fuel into a combustion chamber of a combustion engine comprising a casing provided with a connection for the admission of compressed air, with an outlet shaped to discharge such compressed air in the form of an annular jet, and with a valve seat between said connection and said outlet, a valve adapted to engage said seat and to establish or interrupt the passage of compressed air to said outlet, a valve stem movable in unison with said valve and provided with a longitudinal channel for the passage of fuel, a fuel pump connected to said channel and controlled from the governor of the engine, a fuel nozzle carried by said valve and having an outlet arranged to discharge fuel into the stream of air admitted by said valve, and a check valve in said channel for preventing return flow of the fuel.

5. A device for injecting scavenging air, charging air and fuel into a combustion chamber, comprising a fixed outer casing, a scavenging air valve movably mounted within said casing, a charging air valve movably mounted within said scavenging air valve, a fuel valve located within said air valve, conduits for conducting scavenging air, charging air and fuel to the respective valves, and valve operating mechanism for opening said valves in predetermined timed relation.

6. A device for injecting scavenging air, charging air and fuel into a combustion chamber, comprising a fixed outer casing a hollow scavenging air valve movably mounted within and spaced from said casing and seating thereagainst, whereby an annular chamber is formed between said valve and said casing, a conduit for supplying scavenging air to said chamber, a charging air valve movably mounted within said first-mentioned valve and provided with a stem, an annular compartment being thereby formed between said scavenging and charging air valves, said stem being provided with a passage extending throughout the length thereof, the outlet of said annular compartment being controlled by said charging air valve, a conduit for feeding charging air to said compartment, a valve-controlled fuel nozzle in said charging air valve communicating with the passage in said stem and adapted to discharge a jet of fuel into the anular stream of charging air flowing into the combustion chamber when said charging air valve is open, and valve operating mechanism for opening said valves in predetermined timed relation.

7. A valve for controlling the charge of air to a combustion chamber, comprising a casing provided with a valve seat, a valve within said casing having a head adapted to engage said seat, a valve stem connected to said head, a piston mounted upon said stem in spaced relation to said head whereby an annular compartment is formed between said piston and said head bounded by said piston and head, said piston being slidable within said casing, the area of the piston bounding said compartment being greater than the corresponding area of said valve head, a conduit for supplying compressed air to said compartment, and valve-opening mechanism for opening said valve, said valve, after the combustion chamber has been charged with air being closed, upon release of said valve-opening mechanism, by the pressure of the air in said compartment against said piston.

8. A device for injecting air and fuel into the combustion chamber of a combustion engine, comprising a casing provided with a connection for the admission of compressed air, with an outlet, and with a valve seat at said outlet, a valve adapted to engage said seat to establish or interrupt the passage of compresed air to said outlet, the latter being shaped to discharge the compressed air in the form of an annular jet converging toward a point in front of said outlet, a valve stem movable in unison with said valve and provided with a longitudinal channel for the passage of fuel, means controlled from the governor of the engine for conducting measured quantities of liquid fuel intermittently into said channel, and a fuel nozzle carried by said valve and arranged to direct said fuel into the air jet in the vicinity of said point of convergence, where the velocity of the air is substantially at a maximum, whereby an intimate mixture of said air and fuel is obtained.

FRIEDRICH HOFMANN.